United States Patent [19]

Anzai et al.

[11] 3,866,097

[45] Feb. 11, 1975

[54] CONTROL APPARATUS FOR INDUCTION MOTOR

[75] Inventors: Nobuo Anzai; Narihiro Terazono, both of Inazawa, Japan

[73] Assignee: Mitsubishi Denki Kabushiki Kaisha, Tokyo, Japan

[22] Filed: Aug. 6, 1973

[21] Appl. No.: 385,801

[30] Foreign Application Priority Data

Aug. 10, 1972 Japan.............................. 47-93801

[52] U.S. Cl................. 318/212, 318/227, 318/230
[51] Int. Cl. ............................................. H02p 3/20
[58] Field of Search ............ 318/211, 212, 227, 230

[56] References Cited
UNITED STATES PATENTS

| | | | |
|---|---|---|---|
| 3,011,112 | 11/1961 | Mowery, Jr. ........................ | 318/212 |
| 3,313,992 | 4/1967 | Bohn................................... | 318/212 |
| 3,514,682 | 5/1970 | Corey ................................. | 318/212 |
| 3,602,787 | 8/1971 | Tuchen .............................. | 318/227 |
| 3,652,924 | 3/1972 | Dieterich et al................ | 318/227 X |

Primary Examiner—G. Z. Rubinson
Attorney, Agent, or Firm—Wenderoth, Lind & Ponack

[57] ABSTRACT

A three-phase induction motor has wye-connected primary windings connected to a three-phase electric source through respective thyristors connected in parallel opposition across semiconductor diodes. A transformer includes a primary winding connected across two phases of the source and a secondary winding having both ends connected together to one of the motor windings through thyristors, and a center tap connected to another motor winding. If a voltage representing the actual motor speed is higher than a reference voltage, those thyristors connected to the source are conducting to control AC voltages applied to the motor windings along with the associated diodes. The voltage for the motor speed less than the reference voltage causes the thyristors connected to the secondary transformer winding to be conducted to DC brake the motor. The combination of thyristor and diode may be replaced by a reverse conducting thyristor.

4 Claims, 9 Drawing Figures

CONTROL APPARATUS FOR INDUCTION MOTOR

BACKGROUND OF THE INVENTION

This invention relates to a control apparatus for an induction motor and more particularly to improvements in a control apparatus employing semiconductor devices such as thyristors to control an induction motor operated in the power running and braking modes in a contact-less manner.

Various types of apparatus are known for controlling induction motors operated in the power running and braking modes. Some of such control apparatus require a relative large number of expensive thyristors and some of them have drawn a heavy current from the associated source of electric power.

Accordingly, it is an object of the present invention to provide a new and improved control apparatus for an inductor motor, inexpensive to construct through a decrease in the number of expensive thyristors involved while decreasing the current drawn from the associated source of electric power to substantially reduce or minimize the burden upon the source.

SUMMARY OF THE INVENTION

The present invention provides a control apparatus for controlling an induction motor, comprising, in combination, a source of polyphase alternating current, one main trigger controllable electric valve connected to each of a plurality of phases of the source between the source and a polyphase induction motor, with or without a semiconductor diode connected in parallel opposition to the main electric valve, a single-phase transformer including a primary winding connected to the source and a secondary winding having a center tap connected to one phase of the induction motor, a pair of controlling trigger controllable electric valves connected to both ends of the secondary transformer winding with the same polarity respectively and have respective output terminals connected together to another phase of the induction motor, and means for controlling the main electric valves in the power running mode of operation of the induction motor and controlling the controlling electric valves in the braking modes of operation.

BRIEF DESCRIPTION OF THE DRAWINGS

The present invention will become more apparent from the following detailed description taken in conjunction with the accompanying drawings in which.

BRIEF DESCRIPTION OF THE DRAWINGS

Figure 1:
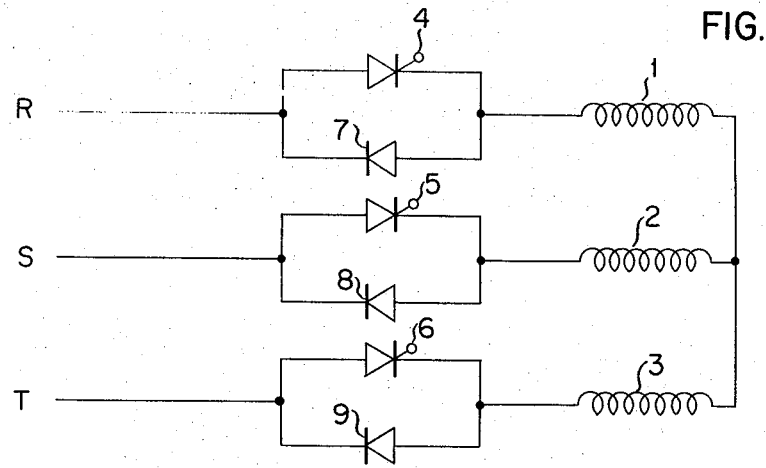
FIGS. 1 through 3 are schematic circuit diagrams of conventional control apparatus for the three-phase induction motor.

Referring now to FIG. 1 of the drawings, each of three wye-connected primary windings 1, 2 or 3 of a three-phase induction motor is shown as being connected to a source of three-phase alternating current R-S-T through an individual combination of a thyristor 4, 5 or 6 and a semiconductor diode 7, 8 or 9 interconnected in parallel opposition. For example, the primary winding 1 is connected to one phase or source terminal R of the source through the thyristor 4 connected in parallel opposition across the diode 7. Then a suitable control device (not shown) is adapted to control the trigger of each thyristor 4, 5 and 6.

The arrangement of FIG. 1 is enabled to control the induction motor when operated in the power running mode but disabled to control it when in the braking mode of operation.

Figure 2:
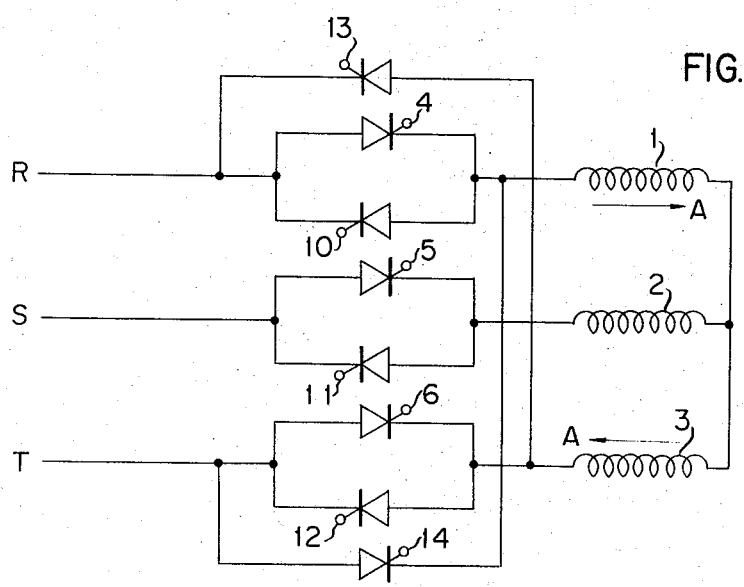

In order to control induction motors operated in the power running and braking modes of operation, there have already be proposed arrangements such as typically shown in FIG. 2 wherein like reference numerals designate the components identical to those shown in FIG. 1. The arrangement illustrated is different from that shown in FIG. 1 only in that in FIG. 2 thyristors 10, 11 and 12 are substituted for the diodes 7, 8 and 9 as shown in FIG. 1 respectively while a pair of thyristors 13 and 14 connect the source terminals R and T to the primary motor windings 3 and 1 respectively. The thyristor 13 is opposite in polarity to the remaining thyristors.

In the power running mode of operation, the thyristors 4, 5, 6, 10, 11 and 12 are operated to control current paths along which current flows into and out from the primary motor windings 1, 2 and 3 to control the induction motor in a manner similar to that described above in conjunction with FIG. 1.

In the braking mode of operation, however, only the thyristors 13, 4, 12 and 14 are fired to form a full-wave rectifier circuit. This causes a direct current to flow through the primary windings 1 and 3 in the direction of the arrow A shown in FIG. 2 thereby to effect the direct current braking. Under these circumstances the thyristors 6 and 10 are maintained in a non-conducting state to prevent the completion of shortcircuiting circuits traced from the source terminal T through the thyristors 6 and 13 to the source terminal R and from the source terminal T through the thyristors 14 and 10 to the source terminal R. Also the thyristors 5 and 11 become nonconducting to prevent a flow of current through the primary winding 2.

Since the thyristors 10, 11 and 12 are operated in the manner as above described, they can not be replaced by semiconductor diodes such as shown in FIG. 1. As a result, the number of thyristors required totals eight. Therefore the arrangement of FIG. 2 is fairly expensive because thyristors are more expensive than semiconductor diodes.

Also, when the induction motor is in the braking mode of operation, the source R-S-T must supply to the motor a current equal to a braking direct current. The braking direct current for induction motors is generally substantially equal to or slightly greater than the current required for the motors operated in the power running mode whenever it is desired to produce the same torque as in the power running mode. Thus the source R-S-T is considerably increased in thermal burden in those applications where the acceleration and deceleration are repeated.

Figure 3:
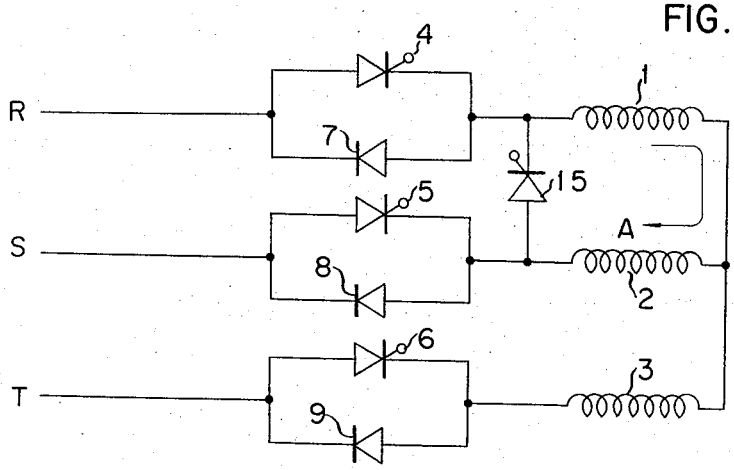

In order to decrease the thermal burden upon the source, there is already known an arrangement such as shown in FIG. 3 wherein like reference numerals designate the components identical to those illustrated in FIG. 1. The arrangement is identical to that shown in FIG. 1 except for a thyristor 15 connecting the primary windings 1 and 2 to each other. In the braking mode of operation, the thyristor 4 is brought into its conducting state to cause a half-wave rectified current to flow through a circuit including, the source terminal R, the now conducting thyristor 4, the winding 1, the winding 2, the diode 8 and the source terminal S, in the direction of the arrow A shown in FIG. 3. In the next half cycle wherein the thyristor and diode 4 and 8 respectively are not conducting, the thyristor 15 becomes conducting to permit electrical energy accumulated on the windings 1 and 2 to be delivered as a current flowing in the direction of the arrow A. That is, the thyristor 15 has the function of a flywheel.

The arrangement of FIG. 3 is advantageous in that it is relatively inexpensive to construct and the current supplied by the source R–S–T has a low effective value because of the presence of the thyristor 15. However, it is disadvantageous in that, as a half-wave current is drawn from the AC source R–S–T, a transformer (not shown) for the source can be saturated to distort a waveform provided by the source.

Figure 4:
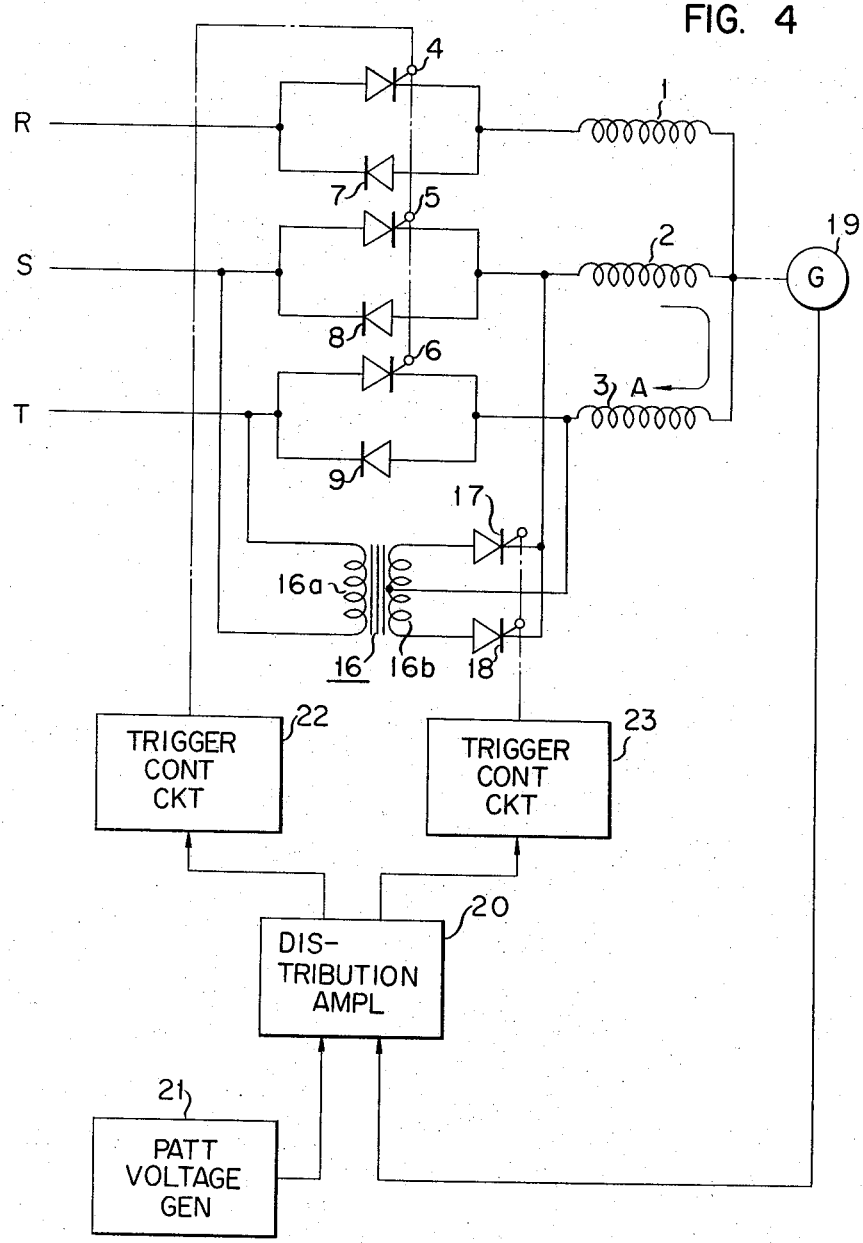
FIG. 4 is a circuit diagram of a control apparatus for a three-phase induction motor constructed in accordance with the principles of the present invention.

The present invention contemplates to eliminate the disadvantages of the prior art type control apparatus as above described by the provision of a control apparatus such as shown in FIG. 4.

In FIG. 4 wherein like reference numerals designate the components identical to those shown in FIG. 1, it is seen that an arrangement disclosed herein comprises, in addition to the arrangement as shown in FIG. 1, a transformer 16 including a primary winding 16a connected across two of the source terminals, in this case, the source terminals S and T of the AC source, and a secondary winding 16b. The secondary winding 16b of the transformer 16 has both ends connected through individual thyristors 17 and 18 to that primary motor winding which is operatively coupled to one of those source terminals across which the primary transformer winding 16a is connected, in the example illustrated, to the winding 2, and a center tap connected to the winding 3 of the induction motor. Then a tachometer generator 19 is operatively coupled to a rotor (not shown) of the induction motor to produce a voltage representing the rate of rotation of the motor or rotor. The voltage from the generator 19 is applied to a distribution amplifier 20 where it is compared with a pattern voltage supplied by a pattern voltage generator 21 to produce a differential voltage therebetween. The pattern voltage from the pattern voltage generator 21 determines the rate of rotation of the induction motor. The distribution amplifier 20 amplifies the differential voltage formed therein and provides an output for driving either one of a pair of trigger control circuits 22 and 23 in accordance with the amplified differential voltage. The trigger control circuit 22 is operative to trigger the thyristors 4, 5 and 6 while the trigger control circuit 23 is operative to trigger the thyristors 17 and 18. The distribution amplifier, pattern voltage generator and ignition control circuits will be subsequently described in detail.

Figure 6:
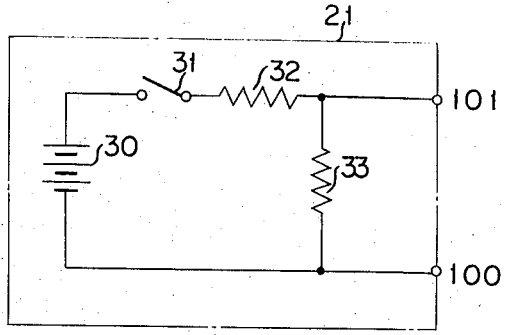
FIG. 6 is a circuit diagram of the pattern voltage generator shown in FIGS. 4 and 5.

The pattern voltage generator and distribution amplifier circuits 21 and 20 respectively suitable for use with the present invention will now be described in conjunction with FIGS. 6 and 7. In FIG. 6, it is seen that a source of dc voltage, shown as a battery 30, is connected across a series combination of a normally open switch 31, a resistor 31 and a resistor 32 while a pair of output terminals 100 and 101 is connected across the resistor 32. The terminal 100 is at a reference potential, for example, at ground potential and that terminal put at the reference potential is designated by the reference numeral 100 in FIG. 6 et seq whether it is an output or an input terminal. With the switch 31 closed, a pattern voltage is developed across the resistor 33 and therefore across the output terminals 100 and 101 as determined by a ratio of resistance between the resistors 32 and 33. The pattern voltage is then applied to the distribution amplifier circuit 20 (as shown in FIG. 7).

Figure 7:
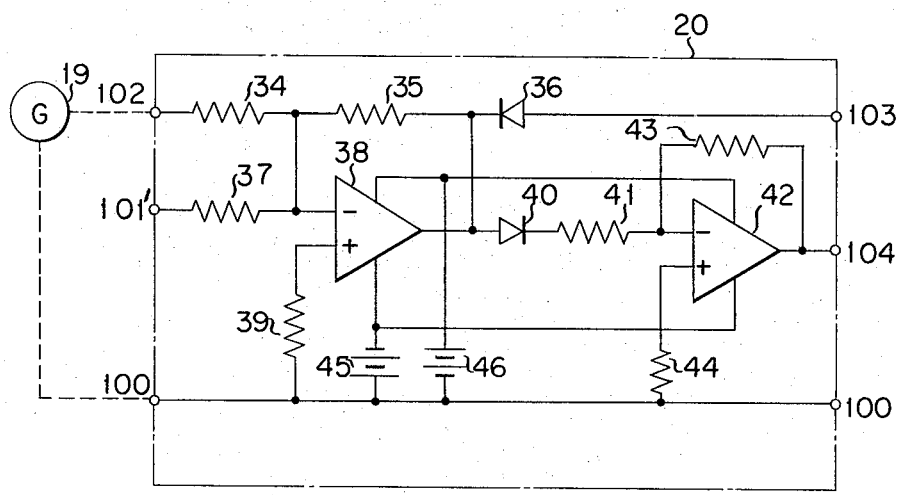
FIG. 7 is a circuit diagram of the distribution amplifier shown in FIGS. 4 and 5.

In FIG. 7, the tachometer generator 19 is shown as being connected across a pair of input terminals 102 and 100 to the distribution amplifier circuit 20. The input terminal 102 is connected to output terminals 103 through a resistor 34, a resistor 35 and a semiconductor diode 36 serially connected in the named order, with the diode 36 poled to block a current flowing from the input to the output terminal. The circuit 20 further includes another input terminal 101' adapted to be connected to the output terminal 101 of the pattern voltage generator circuit 21. Then the input terminal 101' is connected through a resistor 37 to one input, shown in FIG. 7 as being a negative input of an operational amplifier 38 having its other or positive input connected to the terminal 100 or ground through a balancing resistor 39. The operational amplifier 38 includes an output connected to the junction of the resistor and diode 35 and 36, respectively, and also to a semiconductor diode 40 subsequently connected through a resistor 41 to one input, also shown as being a negative input, of another operational amplifier 42. The diode 40 is poled to permit a current to flow from the amplifier 38 into the amplifier 42. The operational amplifier 42 includes a negative feedback resistor 43, while the other or positive input is connected to the terminal 100 through a balancing resistor 44, and its output is connected to another output terminal 104.

The operational amplifiers 38 and 42 include respective intermediate terminals connected to a negative end of a source of dc voltage 45 having a positive end connected to the terminal 100, and additional intermediate terminals connected together and also to a positive end of a source of dc voltage 46 having a negative end connected to the terminal 100. The output terminals 103 and 104 are adapted to be connected to the inputs to the ignition control circuits 22 and 23 respectively (see Figure 4).

In operation, if the operational amplifier 38 provides a positive voltage in response to the outputs from the tachometer generator and pattern voltage generator circuits 19 and 21, respectively, then the voltage is reversed in polarity by means of the diode, resistor and operational amplifier 40, 41 and 42 respectively. A negative voltage thus formed is developed across the output terminals 104 and 100. In that event, the diode 36 is reversely biased and therefore a voltage across the output terminals 103 and 100 is maintained at a zero magnitude.

On the other hand, if the operational amplifier 38 provides a negative voltage in response to the outputs from the tachometer generator and pattern voltage generator circuits 19 and 21, respectively, then the voltage is permitted to flow through the diode 36 into the output terminal 103. At that time, the diode 40 is reversely biased and therefore a zero voltage is developed across the output terminals 104 and 100. The negative voltage at the output terminal 103 is adapted to be applied to the trigger control circuit 22 as a power running signal.

Figure 8:
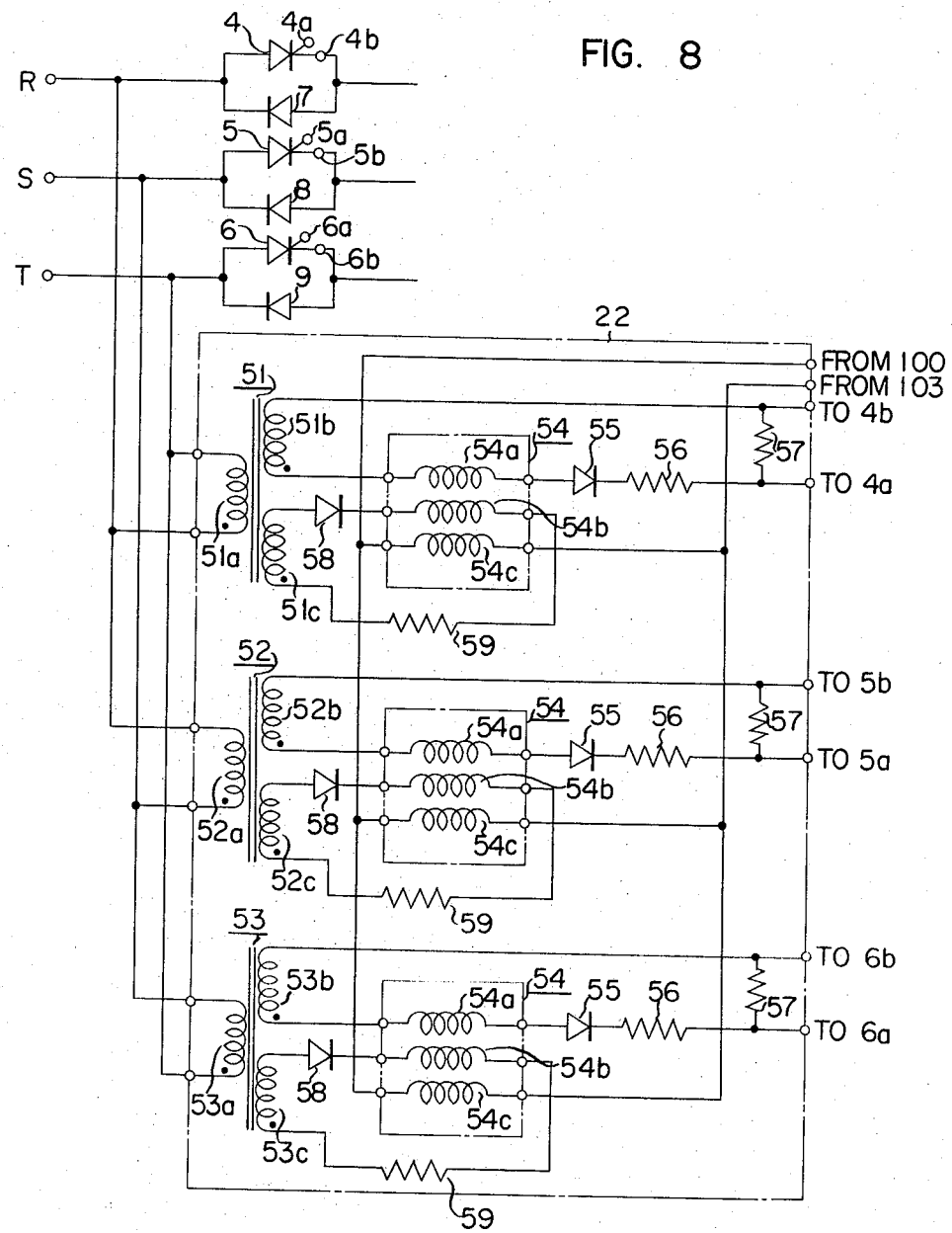
FIGS 8 and 9 are circuit diagrams of both ignition control circuits shown in FIGS. 4 and 5.

FIG. 8 shows a trigger control circuit 22 suitable for use with the present invention and the three thyristor-diode combinations as shown in FIG. 4. As shown in FIG. 8, three transformers 51, 52 and 53 are operatively connected through their associated trigger circuits to the thyristors 4, 5 and 6 for the R, S and T phases of the three phase alternating current source respectively. More specifically, the transformer 51 includes a primary winding 51a connected across the R and T phases of the source, the transformer 52 includes a primary winding 52a connected across the S and T phases of the source, and the transformer 53 includes a primary winding 53a connected across the T and R phases of the source. The three transformers are identical in construction to one another as do their associated trigger circuits and therefore only the transformer 51 and its associated ignition circuit will now be described in detail.

The transformer 51 for the R phase includes a pair of secondary windings 51b and 51c connected to its associated ignition circuit. More specifically, the secondary winding 51b is connected at one end to the thyristor 4 at the cathode electrode 4b and at the other end to the same thyristor 4 at the gate electrode 4a through an output winding 54a of a magnetic amplifier 54, a semiconductor diode 55 and a resistor 56 serially interconnected, with a resistor 57 connected across the cathode and gate electrodes 4b and 4a of the thyristor 4.

The secondary winding 51c is connected across a series combination of a semiconductor diode 58, a resetting winding 54b of the magnetic amplifier 54 and a resistor 59.

The magnetic amplifier 54 further includes a control winding 54c connected so as to be applied thereacross with a power running signal from the amplifier circuit 20.

The diode 55 serves to prevent a reverse voltage from being applied to the gate electrode 4a of the thyristor 4 when the thyristor is in its reversely biased state. The resistor 56 cooperates with the resistor 57 to apply across the gate and cathode electrodes 4a and 4b of the thyristor 4 a voltage sufficient to fire the latter. The diode 58, the resetting winding 54b and the resistor 59 form a circuit for resetting the magnetic amplifier 54 in its saturated state when the thyristor 4 is in its reversely biased state. The control winding 54c of the magnetic amplifier 54 is responsive to a power running signal supplied by the amplifier circuit 20 through the output terminals 103 and 100 to cause the output winding 54a to apply a triggering signal across the gate and cathode electrodes 4a and 4b of the thyristor 4 to control the conduction of the thyristor 4.

The transformers 52 and 53 and the associated ignition circuits are similarly operated to control the conduction of the respective thyristors 5 and 6. In FIG. 7, the thyristors 5 and 6 are shown as including their gate and cathode electrodes 5a and 6a and 5b and 6b respectively.

Figure 9:
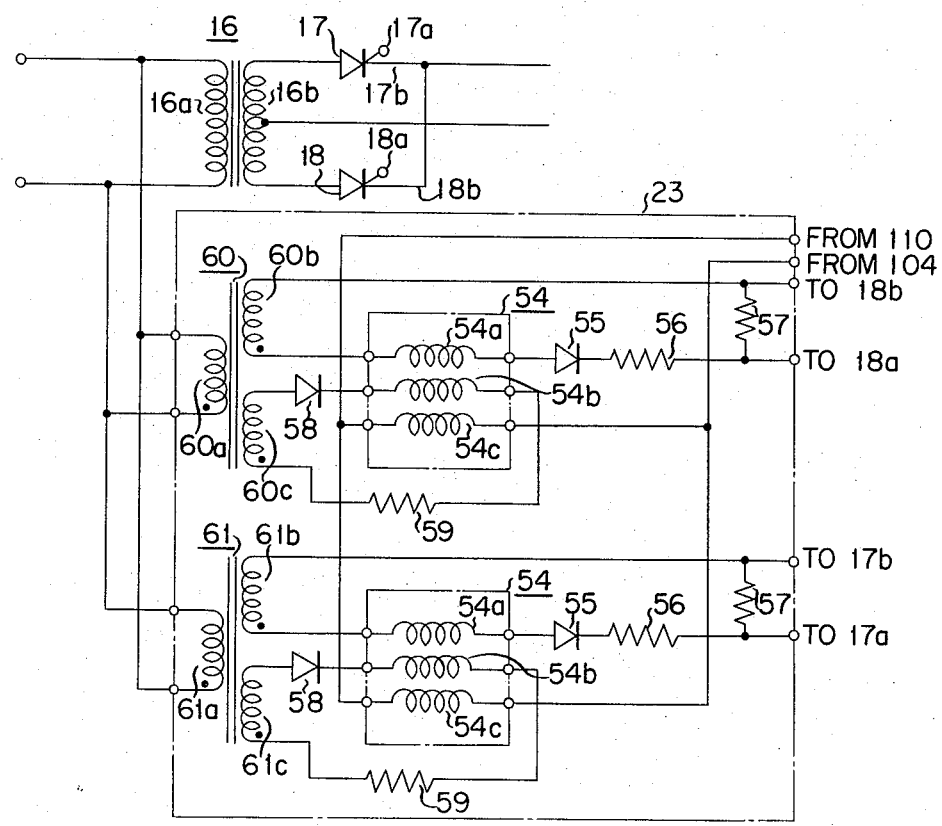

In FIG. 9 wherein like reference numerals designate the components identical to those shown in FIG. 8, there is illustrated, in addition to the braking thyristors 17 and 18 and its transformers 16, the trigger control circuit 23 for those thyristors. The arrangement illustrated is substantially identical to that shown in FIG. 8 and only differences therebetween will now be described.

Transformers 60 and 61 are respectively provided for each of the thyristors 17 and 18 and include a primary windings 60a or 61a connected in parallel circuit relationship with the primary winding 16a of the transformer 16 and a pair of secondary windings 60b and 60c or 61b and 61c connected to the associated ignition circuit in the same manner as above described in conjunction with FIG. 8 except that the output winding 54a of the magnetic amplifier is coupled to the gate and cathode electrodes 17a and 17b or 18a and 18b of the thyristor 17 or 18 while the control winding 54c thereof is applied with a braking signal from the amplifier circuit 20 through the output terminals 104 and 100.

Thus it will be appreciated that, as in the arrangement of FIG. 8, the application of a braking signal from the amplifier 20 to the control winding 54c of the magnetic amplifier 54 causes a triggering signal having a phase angle proportional to the applied signal to be applied across the gate and cathode electrodes 17a and 17b or 18a and 18b of each thyristors 17 or 18 to control the conduction thereof.

With the induction motor operated in the power running mode, the pattern voltage generator 21 provides an output greater than that from the tachometer generator 19 and the distribution amplifier 20 delivers its output the the trigger control circuit 22 to trigger the thyristors 4, 5 and 6 in their conducting state. The now conducting thyristors cooperate with the diodes 7, 8 and 9 to control alternating current voltages applied to the primary motor windings 1, 2 and 3 from the source in the manner as well known in the art.

In the braking mode of operation, the pattern voltage generator 21 is lower in output than the tachometer generator 19 and the amplifier 20 delivers its output to the trigger control circuit 23 to put the thyristors 17 and 18 in their conducting state. Therefore the thyristors 17 and 18 form a center-tapped single-phase full-wave rectifier circuit through which a direct current flows in the direction of the arrow A shown in FIG. 4 resulting in direct current braking.

Figure 5:
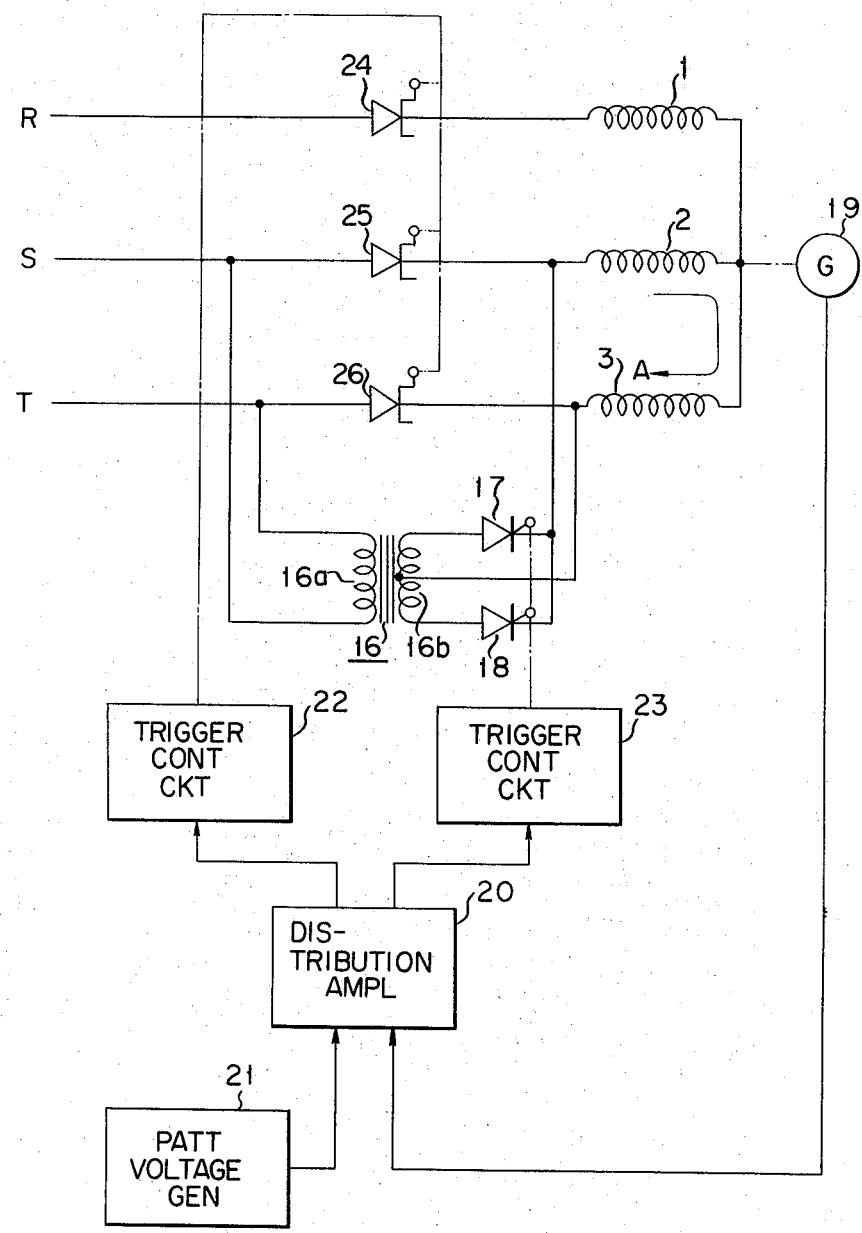
FIG. 5 is a circuit diagram similar to FIG. 4 but illustrating a modification of the present invention.

An arrangement as shown in FIG. 5 is substantially identical to that shown in FIG. 4 excepting that reverse conducting thyristors 24, 25 and 26 are substituted for the combinations of thyristor and diode interconnected in parallel opposition as shown in FIG. 1. In FIG. 5, therefore, like reference numerals have been employed to identify the components identical to those shown in FIG. 4. It will readily be understood that each reverse conducting thyristor 24, 25 and 26 is similar in operation to the combination of the thyristor 4, 5 or 6 and the diode 7, 8 or 9 interconnected as shown in FIG. 4. If desired, a bidirectional thyristor may be used in place of each thyristor 24, 25 or 26.

In the arrangement of FIG. 4 the transformer 16 serves to isolate the cathode from the anode of each diode 7 or 8, resulting in the omission of the thyristors 10, 11 and 12 as shown in FIG. 2 for preventing the source of electrical power from shortcircuiting in the braking mode of operation. Therefore the number of thyristors required amounts to five with three thyristors omitted.

Also a direct current voltage required during direct current braking has a magnitude equal to from 10 to 30 percent of the effective magnitude of an alternating current required for the induction motor in operation. Thus by properly selecting the turn ratio of the transformer 16, it is possible to decrease the current on the primary side thereof. This permits the drain upon the source of electric power to be minimized during the direct current braking.

While the present invention has been illustrated and described in conjunction with a few preferred embodiments, changes and modification may be resorted to without departing from the spirit and scope of the invention. For example, instead of the wye-connection of the primary motor windings, the present invention is equally applicable to the delta-connection thereof.

What we claim is:

1. A control apparatus for controlling a polyphase induction motor, comprising in combination, a source of polyphase alternating current, one main trigger controllable electric valve connected to each of a plurality of phases of said source between said source and said polyphase induction motor, a single-phase transformer including a primary winding connected across said source and a secondary winding having a center tap connected to one of the phases of said induction motor, a pair of controlling trigger controllable electric valves connected to both ends of said secondary transformer winding with the same polarity, respectively, and having respective output terminals connected together to another phase of said induction motor, motor ignition circuits connected to said main electric valves and to said controlling electric valves to control firing angles of the associated electric valves respectively, a tachometer generator operatively coupled for sensing the speed of said motor, pattern generator means operatively connected for generating a pattern of speed instruction for said motor, distribution amplifier means coupled to said tachometer generator and said pattern generator means for detecting a difference between an output from said tachometer generator and an output from said pattern generator means and producing an output dependent upon the detected difference and operatively coupled to said ignition circuits for applying its output to said ignition circuits for said main electric valves when said pattern generator means is higher in output than said tachometer generator and applying said output to said ignition circuits for said controlling electric valves when said pattern generator means is less in output than said tachometer generator, whereby said induction motor is controlled in accordance with the output from said pattern generator means and by continuously changing a voltage applied to said motor.

2. A control apparatus for an induction motor as claimed in claim 1 wherein said distribution amplifier means produces an output proportional to said difference between the output from said pattern generator means and the output from said tachometer generator.

3. A control apparatus for an induction motor as claimed in claim 1, wherein said main electric valve is a reverse conducting thyristor and said controlling electric valve is a thyristor.

4. A control apparatus for an induction motor as claimed in claim 1, wherein said main electric valve is a bidirectional thyristor and said controlling electric valve is a thyristor.

* * * * *